United States Patent Office 3,698,950
Patented Oct. 17, 1972

3,698,950
METHOD OF INHIBITING THE INVERSION OF SUCROSE IN SUGAR CANE JUICE
Alex G. Alexander, Rio Piedras, Puerto Rico, assignor to to the Commonwealth of Puerto Rico, Rio Piedras, Puerto Rico
Filed Mar. 18, 1971, Ser. No. 125,704
Int. Cl. C13d 3/00
U.S. Cl. 127—46 R                                    4 Claims

ABSTRACT OF THE DISCLOSURE

Method for inhibiting the inversion of sucrose in sugar cane juice by adding sodium metasilicate to the pretreated or untreated juice.

BACKGROUND OF THE INVENTION

This invention relates to the inhibition of the action of microbial and sugar cane invertases on the sucrose in sugar can juice by incorporating in the juice sodium metasilicate.

Freshly-milled sugar cane juice contains endogenous can invertases released from the stalk during the milling process, and microbial invertases produced by bacteria or other micro-organisms growing within the juice medium. In a normal factory operation, these enzymes will invert sucrose and thereby lower the ultimate sugar recovery. The inversion process provides hexoses which in turn are metabolized to yield acids and other degradation products which complicate sugar manufacturing processes. The hexose moieties arising from sucrose inversion are also used (by the bacterium *Leuconostoc mesenteroides*) to form gums or dextrans which further lower juice quality, and lower recoverable sucrose through interference with filtration processes. The initial prevention of sucrose inversion thus offers an effective point at which a series of undesirable events can be eliminated from the sugar manufacturing processes. By controlling invertases for periods of 48 to 60 hours, sufficient time will be allowed for the milled juice to reach the clarification step in which the heat-sensitive invertases will be destroyed.

Under atypical conditions, such as occur with mechanical breakdowns, labor difficulties, and uneven delivery of cane to the mills, excessive standing time may elapse for specific batches of juice. Sucrose preservation can thus be of value in such instances.

Further, during week-end or holiday closure of sugar mills, a preservative would be useful to prevent deterioration of standing juice, or of microbe growth within juice contaminated factory equipment.

It has now been found that by adding sodium metasilicate ($Na_2SiO_3 \cdot 9H_2O$) to sugar cane juice it is possible to inhibit the action of sugar cane and microbial invertases on the sucrose contained therein.

SUMMARY OF THE INVENTION

This invention provides a method of inhibiting the inversion of sucrose in sugar cane juice which comprises adding to the juice an effective amount of sodium metasilicate, sufficient to inhibit the inversion of the sucrose.

This invention also describes a method of inhibiting the inversion of sucrose in untreated sugar cane juice which comprises adding to the juice 40–60 micromoles of sodium metasilicate per ml. of juice.

There is further described a method of inhibiting the inversion of sucrose in sugar cane juice which comprises first filtering crude sugar cane juice and then adding to the filtered juice 10–12 micromoles of sodium metasilicate per ml. of juice.

This invention also provides a method of inhibiting the inversion of sucrose in sugar cane juice which comprises filtering crude sugar cane juice, treating the filtered juice with zinc sulfate and barium hydroxide, and then adding to the juice 2–3 micromoles of sodium metasilicate per ml. of juice.

DETAILED DESCRIPTION OF THE INVENTION

Although we do not wish to be bound by any theoretical considerations, paper-chromatographic and gas-liquid chromatographic evidence points toward a relationship between soluble metasilicate, i.e., silicic acid, and the sucrose molecule which prevents a normal union of invertase with its substrate. The very abruptness of the silicate inhibition suggests that a physical change has occurred with respect to the silicic acid, possibly conversion from a sol to gel form. Examination of hexose inversion products over a 96-hour period showed that fructose was the preferential hexose subsequently metabolized by microbes. This was verified in other experiments, and in addition it was shown that glucose rather than fructose was utilized when metasilicate was present.

Figure 1:
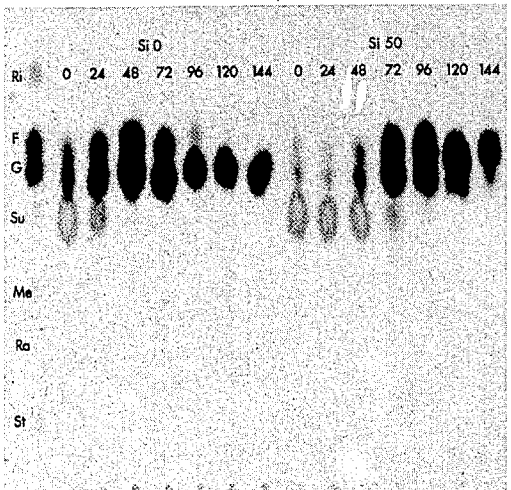
FIGS. 1, 4 and 5, are paper chromatograms of sugar cane juice samples incubated for varying periods of time with variable quantities of sodium metasilicate.

FIG. 1 is a paper chromatogram of sugar cane juice samples incubated with silicate (Si 50) and without silicate (Si 0) for a period of 144 hours. Incubation temperature=37° C. Black spots correspond to masses of reducing sugars liberated upon hydrolysis of sucrose by invertases. Light-gray spots on the level of "Su" correspond to sucrose. Authentic sugars are identified along the left-hand margin as follows: Ri=ribose; F=fructose; G=glucose; Su=sucrose; Ne=melezitose; Ra=raffinose; St=stachyose. The chromatogram was run in one dimension with the solvent butanol-pyridine-water (6:4:3 v./v.). This behavior suggested that a reaction had occurred between the silicic acid and a site at the fructose end of sucrose. Gas-liquid chromatographic analyses of aqueous sugar-silicate solutions (following reaction with trimethylsylil reagent) revealed atypical retention peaks for sucrose at the 50 micromoles level. This is shown in FIG. 2.

Figure 2:
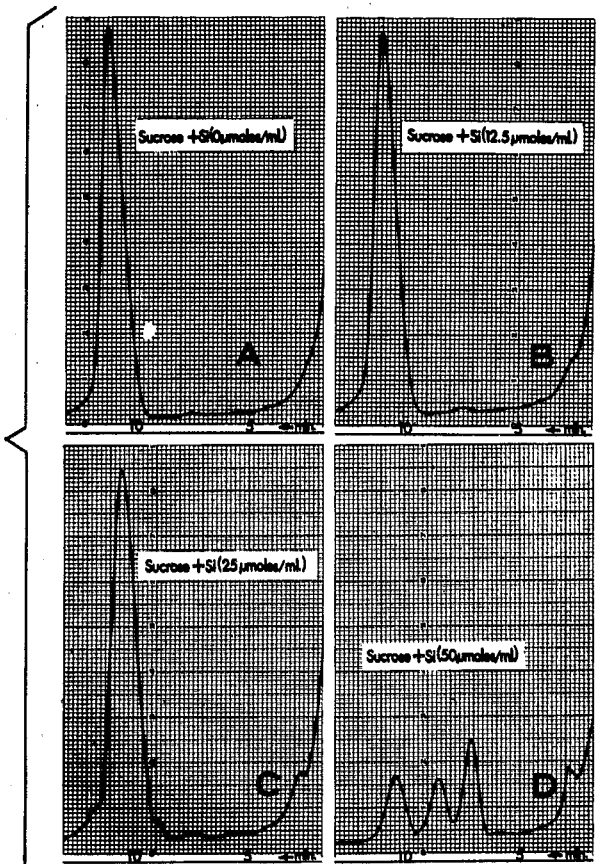
FIG. 2 is a graphical representation of the results of the gas-liquid chromatography of various sucrose-sodium metasilicate preparations.

FIG. 2 is a graphical representation of the gas-liquid chromatography of sucrose-silicate preparations. A to C: Normal sucrose retention peaks obtained in the presence of 0, 12.5, and 25 micromoles of sodium metasilicate per ml. D represents atypical sucrose retention peaks for fructose in the presence of 50 micromoles of meta-silicate per ml. Similar tests with free glucose plus silicate revealed no differences in glucose retention peaks, whereas fructose showed atypical retention patterns with metasilicate. This is shown in FIG. 3.

Figure 3:
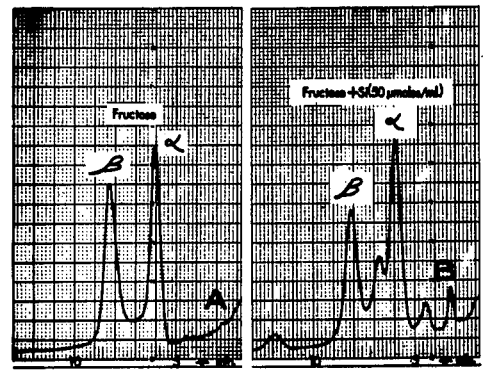
FIG. 3 is a graphical representation of the results of the gas-liquid chromatography of various fructose-sodium metasilicate preparations.

FIG. 3 is a graphical representation of the gas-liquid chromatography of fructose-silicate preparations. A: Alpha-and beta-D-fructose retention peaks in the absence of meta-silicate. B: Atypical retention peaks for D-fructose in the presence of 50 micromoles of metasilicate per ml. This is consistent with the view that metasilicate in aqueous solution is capable of forming a sucrose-silicate complex at the fructose end which is restrictive against normal beta-fructosidase action. Moreover, the lack of atypical retention peaks at lower silicate levels (see FIG. 2) adds support to the concept of a physical (gel) configuration which restricts enzyme-substrate union in the lower silicate range.

Other forms of silicon other than sodium metasilicate, including Ludox colloidal silica and calcium metasilicate, failed to produce similar inversion control. No inversion control was obtained with the commercial product "Busan 881."

The sodium metasilicate can be added to the crude untreated sugar cane juice or the juice can be first filtered to remove suspended particles and other debris. In addition, after filtering, the sugar cane juice can be further treated with zinc sulfate and barium hydroxide. It is found that the amount of sodium metasilicate needed to inhibit the inversion of the sucrose in the sugar cane juice is dependent upon whether or not the sugar cane juice is treated directly, or is subjected to the aforementioned pretreatments. Accordingly, if the sugar cane juice is to be used directly, 40–60 micromoles of sodium metasilicate is needed per ml. of sugar cane juice. If the juice is filtered first, 10–12 micromoles of sodium metasilicate are needed per ml. of sugar cane juice, and if the juice is treated with zinc sulfate and barium hydroxide after filtering, only 2–3 micromoles of sodium metasilicate are needed per ml. of the juice. The effective amount of sodium metasilicate needed to inhibit the inversion of the sucrose in the sugar cane juice where the juice has been subjected to a partial pretreatment can readily be determined by routine experimentation.

Example I

Invertase was prepared from lyophilized immature storage tissue taken from 16-week-old plants (variety P.R. 980) grown in sand culture. Powdered tissues were extracted with water at room temperature. The extracts were clarified by passage through cheesecloth and by subsequent certrifuging at 3,000 r.p.m. Invertase was precipitated from the supernatant liquid with solid ammonium sulfate between 38- and 52-percent saturation. The enzyme-containing protein was taken up in water, reclarified by centrifuging, and dialyzed against water for 6 hours at 4° C. The invertase preparation was then fractionated by filtration through a 2.5 x 40-cm. column of G–200 Sephadex, a procedure which successfully isolates invertase from the bulk of noncatalytic protein. All fractions derived from the gel column were assayed for invertase as described previously in J. Agr. Univ. P.R. 49, 287–307 (1965), and peak activity fractions were combined and refrigerated at 5° C.

The standard invertase digest was composed as follows: 1.0 ml. of acetate buffer (pH 5.5); 1.0 ml. of 5-percent substrate solution (sucrose, raffinose, melezitose, stachyose, turanose); 0.5 ml. of Si solution (sufficient to make a final Si concentration of 0.10 to 100 $\mu$moles of Si per milliliter of digest); and 0.5 ml. of enzyme preparation. The standard reaction proceeded for 2 hours at 37° C. and was terminated by a 10-minute submersion in boiling water. Reference vessels contained water in place of Si solution. The Si source for all experiments was sodium metasilicate, $Na_2SiO_3 \cdot 9H_2O$, which in solution forms orthosilicic acid, $Si(OH)_4$.

Samples of inactivated invertase digests were chromatographed on Whatman No. 1 filter paper, using the solvent mixture butanol-pyridine-water (6:4:3, v./v.) in one dimension. Spots representing substrate and products were developed by the silver nitrate dip method as described in Arch. Biochem. and Biophys. 94, 121–7 (1961).

Chromatographic results showed that the sugars were acted upon by invertase. Thus, sugar cane invertase preparations acting upon sucrose and raffinose were shown to be totally inhibited by sodium metasilicate levels exceeding 3 micromoles per milliliter of enzyme-substrate digest.

Example II

Sugar cane invertase was prepared from lyophilized immature storage tissues of 16-week-old plants of the variety P.R. 980. All plants were grown in sand culture with a balanced nutrient supply with the nutrient concentrations, expressed as milliequivalents per liter, being provided as follows: Nitrate, 10; phosphate, 6; potassium, 5; calcium, 3; magnesium, 2; and sulfate, 2. Micronutrients, expressed as parts per million, were supplied as follows: Boron, 0.05; copper, 0.02; manganese, 0.50; molybdenum, 0.01; and iron, 1.0.

The finely ground tissues were extracted with water at 22° C. Extracts were clarified by passage through cheesecloth and by subsequent centrifuging for 10 minutes at 3,000 r.p.m. Invertase was precipitated from the supernatant liquid with solid ammonium sulfate at pH 5.6. The latter step yields about 95 percent of the enzyme between 38- and 52-percent saturation. The invertase-containing precipitate was taken up in water and clarified with the centrifuge. It was then dialyzed against distilled water for 2 hours and reclarified by centrifuging at 3,500 r.p.m. for 20 minutes.

The next step involved filtration of the invertase preparation through a 2.5 x 40-cm. column of G–200 Sephadex. This procedure successfully isolates cane invertase from contaminant amylase, phosphatase, and noncatalytic protein. Composed of highly cross-linked dextrans which act as a molecular sieve, Sephadex was soaked in water for about 10 minutes and slowly packed by gravity in an air-free column. Ten to fifteen milliliters of invertase preparation were absorbed on the gel and eluted with distilled water. Samples of all effluent fractions were assayed for invertase by a colorimetric, reducing-sugar method previously described in J. Agr. Univ. P.R. 49, 287–307 (1965). Peak-activity fractions were combined and refrigerated at 4° C.

Yeast invertase was obtained from Difco Laboratories, Detroit, Mich. The preparation was supplied as a dessicated extract of yeast cells, to which water was added just prior to use. Both yeast and cane invertase gave identical values for Km and pH optima with sucrose. Their paper electrophoresis and gel filtration behavior was virtually indistinguishable when sucrose was used as substrate. The aqueous dilution suggested by Difco Laboratories contained only about one-fifth as much protein as the cane preparation.

For both sugar cane and yeast invertase the standard reaction digest was composed as follows: 1.0 ml. of acetate buffer (pH 5.5); 1.0 ml. of 5-percent substrate solution; 0.5 ml. of silicon (Si) solution or water, and 0.5 ml. of enzyme. All reactions were run at approximately 37° C. Experiments of more than 12 hours duration were conducted under toluene. Samples of cane- and yeast-invertase digests were withdrawn immediately after mixing of the enzyme and substrate, and were inactivated by a 10-minute submersion in boiling water. Other samples were withdrawn and inactivated at intervals ranging from 30 minutes to 72 hours. The Si source was sodium metasilicate, $Na_2SiO_3 \cdot 9H_2O$.

Samples of inactivated digests were chromatographed on Whatman No. 1 filter paper, using the solvent mixture butanol-pyridine-water (6:4:3, v./v.) in one dimension. Spots representing substrates and products were developed by the silver nitrate "dip" method of Dube and Nordin described in Arch. Biochem. and Biophys. 94, 121–7 (1961). Dried chromatograms were first submerged in acetone saturated with silver nitrate. After drying they were immersed in a 0.4-percent solution of NaOH in methanol and allowed to remain until spots were celarly defined. Chromatograms were dried after washing and stabilization in aqueous 10 percent sodium thiosulfate.

The results showed that both sugar cane and yeast invertase were inhibited in vitro by sodium metasilicate at levels between 2 and 3 micromoles per milliliter.

Example III

Figure 4:
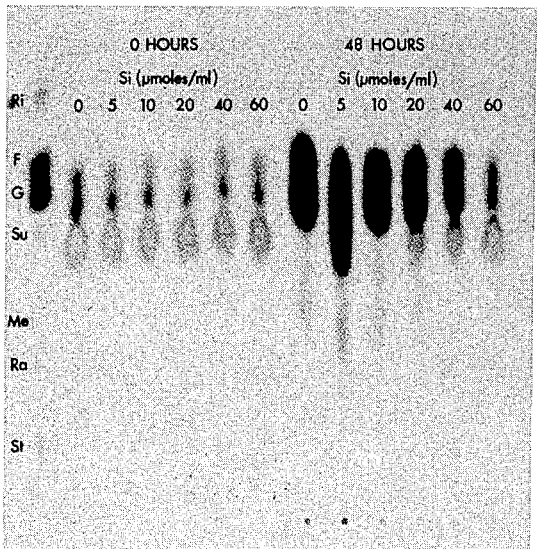

Sodium metasilicate in an amount of 40–60 micromoles of Si per ml. of juice is added to untreated control sugar cane juice. After 48 hours of incubation at 30° C. it is found that the sucrose in the juice is essentially unchanged. FIG. 4 is a paper chromatogram or sugar cane juice samples incubated for 48 hours with variable quantities of sodium metasilicate (Si). Sugar identification is the same as given for FIG. 1, and the chromatogram was run under the same conditions. Incubation temperature 30° C.

Example IV

Figure 5:
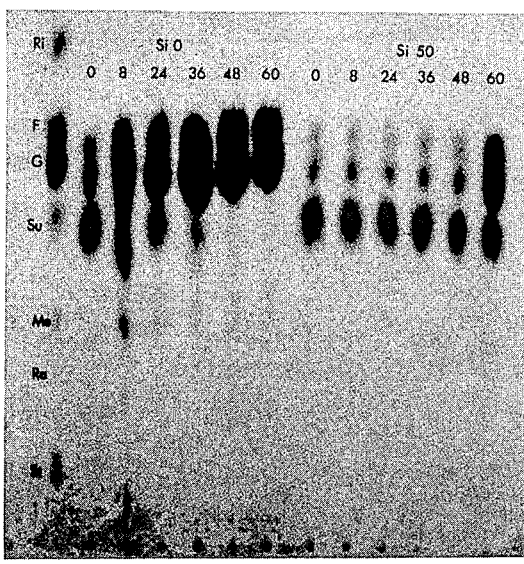

When sufficient sodium metasilicate to provide 50 micromoles of Si per ml. of untreated cane juice is used, there is little or no change in the surcose concentration at an incubation period of 48–60 hours at 30° C. This is shown in FIG. 5, which is a paper chromatogram of sugar cane juice samples incubated for 60 hours with zero and 50 micromoles per ml. of sodium meta-silicate (Si 0 and Si 50, respectively). Numbers 0 to 60 refer to incubation time in hours. Sugar identification and chromatographic conditions are the same as given for FIG. 1. Incubation temperature=30° C.

Prolonged experiments of 96 hours duration show that this concentration still produces partial inversion control at 96 hours of incubation, while untreated control juice experiences complete inversion after 48 hours. Another experiment revealed the preservative action breaking down between 48 and 72 hours, while untreated juice was totally inverted between 24 and 48 hours. This can be seen in examining the results in FIG. 1. In the absence of sodium metasilicate, sucrose and polarization values deteriorate rapidly between 8 and 36 hours at an incubation temperature of 30° C.

Example V

When the cane sugar juice is first passed through filter paper (Whatman No. 1), only sufficient sodium metasilicate to provide 10–12 micromoles of Si is needed to preserve the sucrose for 48 hours at 30° C. It is found that precipitation of suspended matter from the filtered juice with zinc sulfate and barium hydroxide lowers the silicon (Si) requirement to 2–3 micromoles per ml. of cane juice.

What is claimed is:

1. A method of inhibiting the invention of sucrose in sugar cane juice which comprises adding to the juice an effective amount of sodium metasilicate.
2. The method of claim 1 wherein the sugar cane juice is untreated and the amount of sodium metasilicate is 40–60 micromoles per ml. of juice.
3. The method of claim 1 wherein the sugar cane juice is pretreated by filtering before the sodium metasilicate is added and the amount of sodium metasilicate is 10–12 micromoles per ml. of juice.
4. The method of claim 1 wherein the sugar cane juice is pretreated by filtering and treating with zinc sulfate and barium hydroxide before the sodium metasilicate is added and the amount of sodium metasilicate is 2–3 micromoles per ml. of juice.

References Cited

UNITED STATES PATENTS

| 2,539,397 | 1/1951 | Bottoms | 127—48 |
| 2,900,283 | 8/1959 | McGahen | 127—46 R |

OTHER REFERENCES

"Cane Sugar Handbook," G. L. Spencer, ed., 8th edition, 798–800, John Wiley and Sons, New York, 1945.

"Hackh's Chemical Dictionary," J. Grant, ed., 4th edition, 621, McGraw-Hill Book, Co., New York, 1969.

MORRIS O. WOLK, Primary Examiner

S. MARANTZ, Assistant Examiner

U.S. Cl. X.R.

127—41